United States Patent
Jagers

[15] 3,672,251
[45] June 27, 1972

[54] SAW

[72] Inventor: Leopold Jagers, Rudolf-Diesel-Str.-1, 535 Euskirchen/Rhineland, Germany

[22] Filed: Oct. 5, 1970

[21] Appl. No.: 77,825

Related U.S. Application Data

[63] Continuation-in-part of Ser. No. 20,852, March 18, 1970, abandoned.

[30] Foreign Application Priority Data

Oct. 7, 1969 Germany .....................P 19 50 512.5
March 19, 1969 Germany .....................P 19 13 833.1

[52] U.S. Cl. ..................................83/169, 83/464, 83/467, 83/490, 83/581, 143/6 H
[51] Int. Cl. .................................B23d 47/02, B23d 45/04
[58] Field of Search....................83/169, 464, 467, 468, 490, 83/581; 143/6 H

[56] References Cited

UNITED STATES PATENTS 1,481,569  1/1924  Tannewitz..............................143/6 H
3,574,315  4/1971  Boultinghouse.......................143/6 H

*Primary Examiner*—James M. Meister
*Attorney*—Burgess, Dinklage & Sprung

[57] ABSTRACT

A saw comprising a base plate 1 (FIG. 1), a disc 7 rotatably mounted on the base plate; clamping means disposed over the disc 7 and comprising forward elements 3, 3a and a backstop element composed of arms 18a, 18b (FIG. 2), and the arcuate member 19 joining the said arms, said clamping means being disposed over the disc 7, and a saw assembly 13, 14, 15, 16, 17 pivotally mounted on the machine via pin 11 (FIG. 1). The arcuate member 19 of the backstop is in bearing relation with the mount of the saw assembly adjacent the upper level of the arcuate member 19a, 19b. To accommodate different size workpieces, an auxiliary backstop 28 (FIG. 4) is provided to permit positioning a small workpiece in a more forward position with respect to the path of the saw blade, permitting more effective operation of the saw.

15 Claims, 9 Drawing Figures

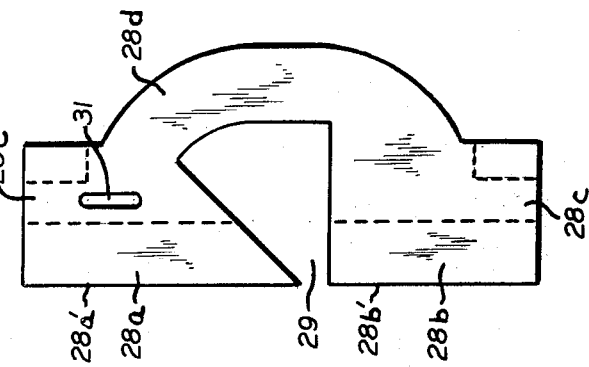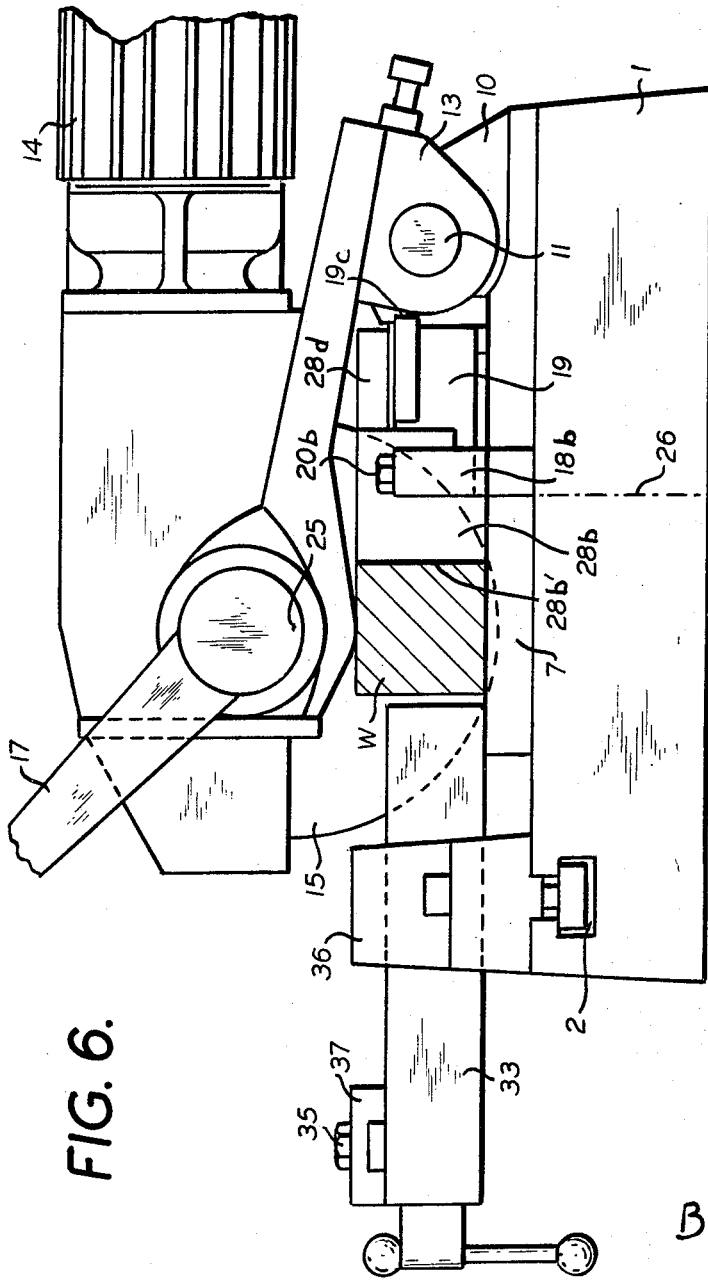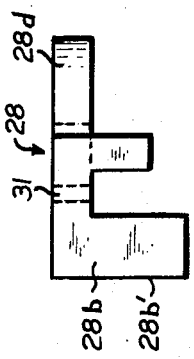

SAW

This application is a continuation-in-part of Ser. No. 20,852, filed Mar. 18, 1970 and now abandoned

BACKGROUND

This invention relates to a cold circular saw, i.e., a saw for cold-sawing metals. Cold circular saws are conventional wherein the saw assembly comprising the sawing blade together with the driving motor thereof, is pivotable in the vertical saw blade plane relative to the work to be sawn, for instance by means of a pivot pin which is mounted on a rotary disc, rotatable about a vertical axis relative to the base plate. A backstop comprising a vise and an abutment are disposed over the rotary disc, supported thereon, and have a passage for the saw blade, and are secured to the base plate for clamping the work.

In a conventional cold circular saw of this type, the abutment comprises two strips disposed in alignment, the saw blade being capable of passing through between said two strips, said strips being connected to one another at their sides facing away from the vise by means of a semi-circular arcuate member, said arcuate member engaging a complementary circular groove of the rotary disc with a rib. In this conventional saw, the rotary disc is loosely positioned in a complementary recess of the base plate, on which it is moreover supported through the intermediary of a flange. It cannot be avoided in such an arrangement, in particular in cases of high saw loads, that the abutment is subjected to a slight vibratory movement relative to the base plate as a result of the periodical loading of the saw teeth. It is of a decisive significance, however, for the useful life and for the wear of the saw blade that the work to be sawn is retained absolutely motionless.

THE INVENTION

An object of the invention is the provision of an improved retaining means of the work to be sawn and of the abutment retaining the work to be sawn. This can be accomplished with cold circular saws of the type referred to hereinbefore in that the upper margin of the abutment engages the rotary disc at one point and the rotary disc is supported on the base plate with a portion located outside of this point.

Preferably this arrangement is provided in such a way that the abutment of the backstop comprises two strips positioned in alignment and permitting the passage of the saw blades, said strips having a projection at the side facing away from the vise which with its upper edge engages an accordingly upwardly extended projection of the rotary disc, said projection of the rotary disc extending beyond the remaining periphery of the rotary disc in radial direction and resting on the base plate with its end. As a result of this arrangement, a rigid frictional engagement is obtained between the part of the base plate carrying the vise, the work to be sawn, the abutment, the rotary disc, in particular the elevated projection of the rotary disc, which serves as a mount for the saw assembly, and that portion of the base plate, on which said portion of the rotary disc rests, thus in particular the said projection. A particularly simple construction is obtained by simply having the rotary disc closely resting on the base plate over its entire circumference. This also insures that the rotatability of the rotary disc cannot be impaired by sawing fines. Preferably, the rotary disc is drawn down against the base plate by a suitable arrangement when it is to not be rotated. The rotary disc and the base plate have passages to permit coolants and fines to be discharged, said passages being arranged in such a way that the discharge of the coolant is kept away from the supporting location of the rotary disc on the base plate.

The invention also aims at achieving an improvement of such a circular saw so that workpieces of a wide variety of widths (measurement from forward to rear part of workpiece) can be held absolutely motionless so that they can be cut with a minimum of stress on the saw. The minimum stress on the saw takes place when the substantially vertical plane in which the advance of the saw blade axis takes place in the case of a square cutoff (i.e., cut at right angle to length of workpiece) of the workpiece runs through the center of the width of the workpiece (see FIG. 6).

According to the invention, a circular saw of the above-named kind is constructed in such a manner that the substantially vertical plane in which the sawblade axis is advanced in the case of a square cutoff of the workpiece is at a distance of several centimeters from the above-mentioned backstop bars, and an auxiliary, removable backstop bar attachment having two backstop arms whose faces are aligned with one another and having on its underside a groove parallel with these surfaces, the shape of the said groove matching the shape of the backstop bars affixed to the base plate, can be mounted over the last-mentioned backstop bars and set down virtually onto the surface of the turntable.

Preferably the auxiliary backstop bar attachment arms are rigidly joined to one another by a connecting member which lies above the arcuate portion joining the backstop bars of the fixed backstop when the auxiliary backstop bar attachment is mounted on the principal backstop bars. Furthermore, a cutout to accommodate the sawblade is provided both in principal backstop and in the auxiliary backstop bar attachment and flares away from the vise at a 45° angle to at least one side, and the auxiliary backstop bar attachment is displaceable longitudinally on the backstop bars.

THE DRAWINGS

With the foregoing object in view, together with such additional objects and advantages as may subsequently appear, the invention resides in the parts, and in the construction, combination and arrangement of parts disclosed, by way of examples, in the following specification of certain modes of execution of the invention; reference being had to the accompanying drawings which form a part of said specification and in which drawings:

FIG. 6 is a side elevation of the circular saw of FIG. 4;

FIG. 8 is a top view of the auxiliary backstop bar attachment;

FIG. 9 is an end view of the auxiliary backstop bar attachment.

Figure 1:
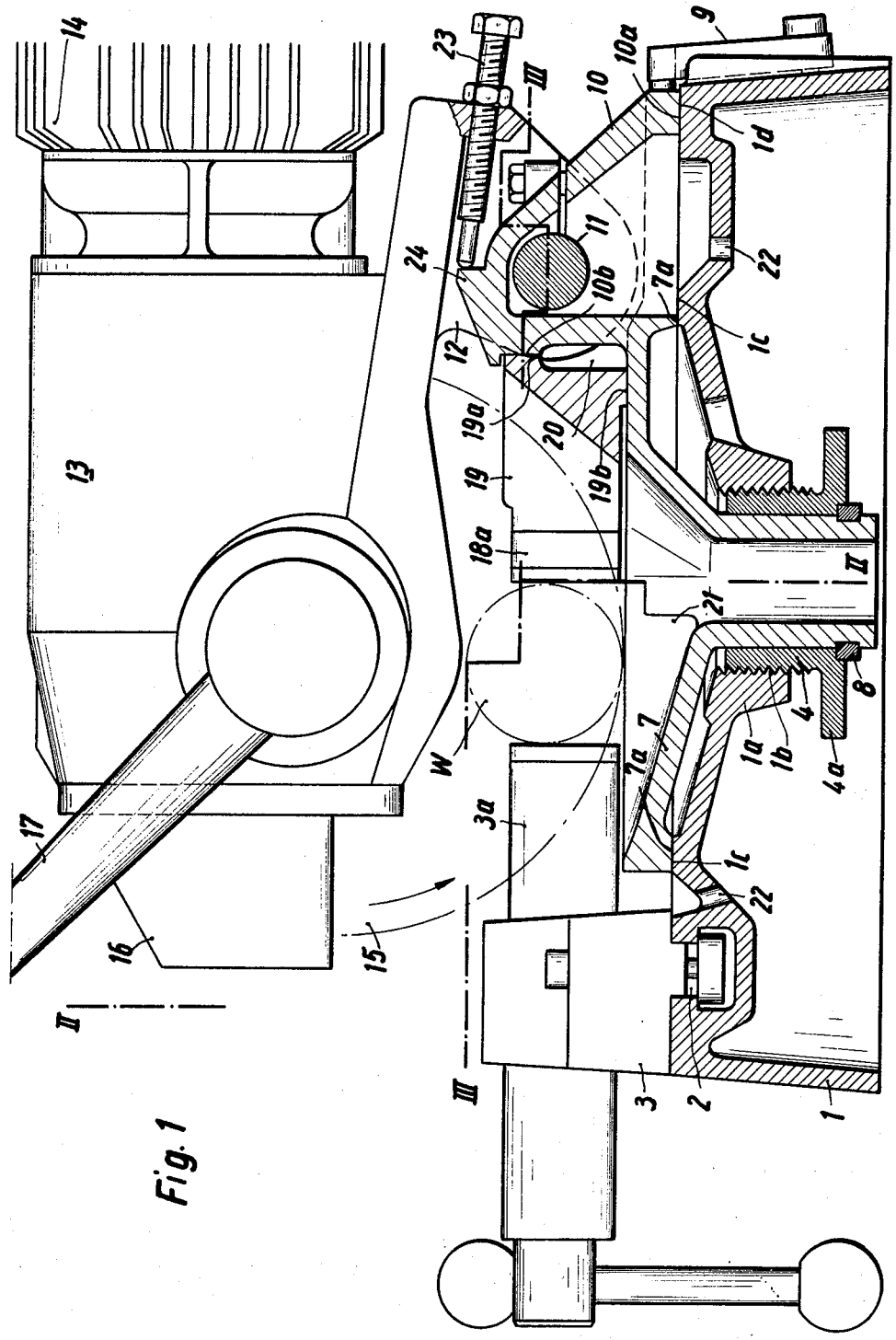
FIG. 1 is a side elevation view partly in section of a cold circular saw of this invention.
Figure 2:
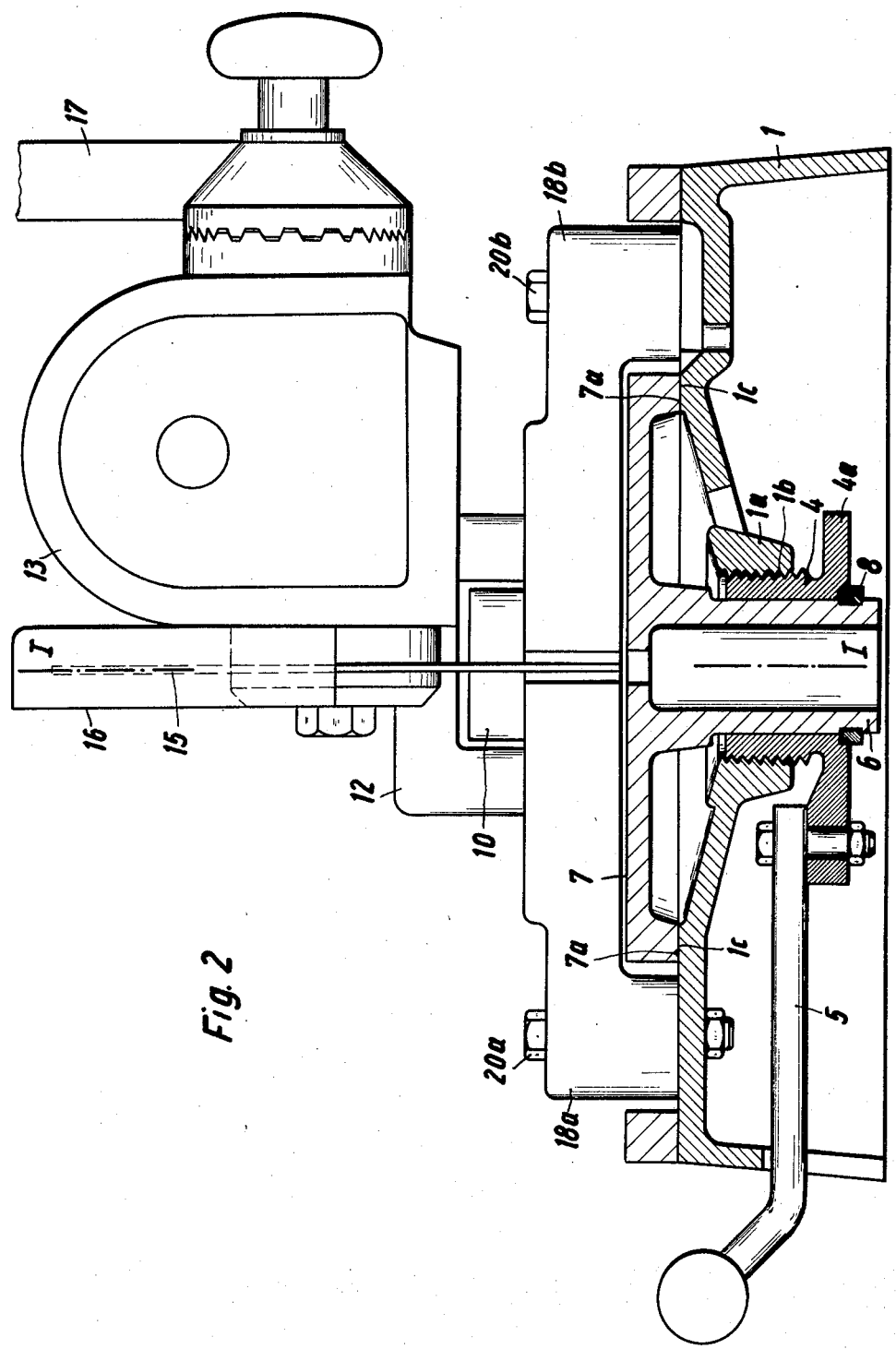
FIG. 2 is a front elevation partially in section of the saw taken along line II—II of FIG. 3.
Figure 3:
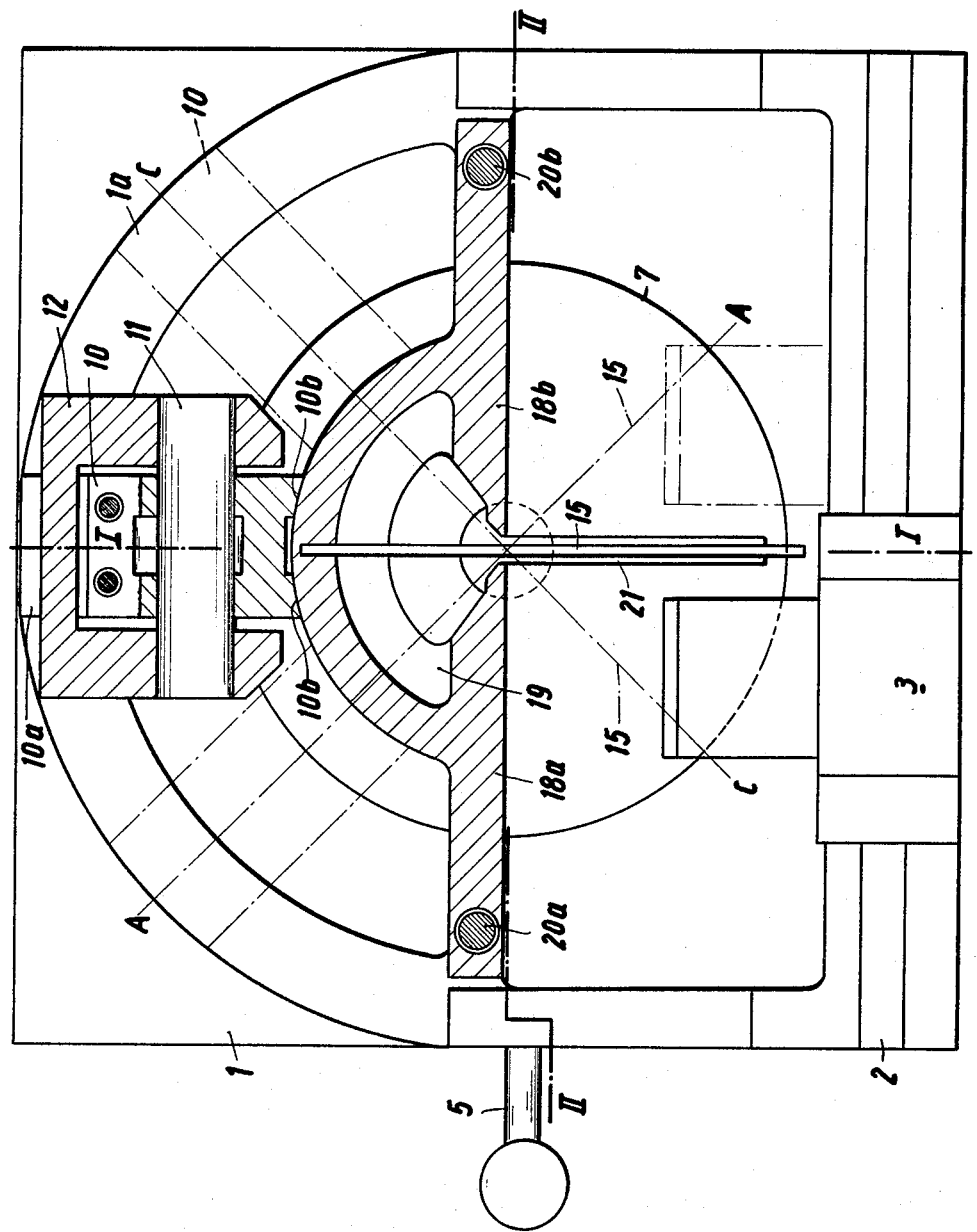
FIG. 3 is a top plan view, partially sectional view of the saw taken along line III—III of FIG. 1.

Referring to FIGS. 1–3, a quadrangle base plate 1 has a groove 2 along its front side for guiding a vise 3. In the middle thereof, it is provided with a threaded bore 1b within an enlargement 1a, into which bore a male threaded sleeve 4 is screwed in, the flange 4a of which is connected to a hand lever 5. A circular-cylindrical projection 6 of a circular disc 7 is mounted in the sleeve 4, the margin 7a of which disc is supported on a complementary circular surface 1c of the base plate 1. A ring 8 is inserted into the projection 6, which ring is abutted by the flange 4a of the sleeve 4. By pivotting the lever 5 about the axis of the sleeve 4, the abutment surfaces 7a are drawn down against the abutment surface 1c; by pivotting the lever 5 in the opposite direction, the flange 4a is released from the ring 8 so that then the disc 7 merely rests on the surface 1c as a result of its own gravity. In all cases, the surfaces 7a and 1c closely engage with one another, so that there no coolant containing sawing fines can enter. The disc 7 can be rotated about its axis when tight engagement between the flange 4a and ring 8 is released by turning of lever 5 to loosen such engagement. This can be done manually by having the operator of the machine grasp the transmission 13 or the motor 14, which are pivotally mounted via projection or mount 10, on disc 7, to thereby pivot the disc 7 about its axis of rotation; for instance by 45°, if a cut of 45° is intended; the saw blade then is in the plane A—A or C—C shown in FIG. 3. In FIG. 3 those positions of the saw blade 15 and of the projection 10 are indicated in phantom. An arresting mechanism is provided for arresting the disc 7 in the selected position, of which mechanism the handle 9 is illustrated in FIG. 1.

The rotary disc 7 is provided with a projection or mount 10 at one point, the end of which farthest away from the axis of rotation engages a complementary annular surface of the base plate 1. A pin 11 is positioned in the projection or mount 10, at the ends of which pin a forked projection 12 and a casing 13 are mounted, carrying the electric driving motor 14 and furthermore supporting a transmission as well as the bearing for the circular saw 15 and a protective hood 16 for this saw and a manual lever 17 by means of which the casing 13 can be pivotted about the axis of the pin 11.

An abutment for the workpiece W has the form of two strips 18a, 18b (FIGS. 2 and 3) positioned in alignment and consisting of one piece together with a semi-circular arcuate portion or projection 19. The strips 18a and 18b are firmly connected to the plate 1 at their ends by means of bolts 20a, 20b. The projection 19 engages the rotary disc 7 at two different points, namely in both cases at its outer margin; on the one hand, it engages a complementary surface 10b of the projection 10 of the rotary disc with its upper margin 19a; on the other hand it engages with point 19b at its bottom side, which point rests on the planar top side of the rotary disc 7. A cavity 20 (FIG. 1) is provided underneath the abutment points 19a-10b between the parts 19 and 10. The bearing surfaces 19a-10b are disposed adjacent the upper level of the arcuate member 19. The spacing between the plane of the disc 7 on which the workpiece is supported and the mid-elevation point of the bearing surfaces 19a-10b can be about 2-5 cm, preferably 3-4 cm.

The vise 3 is capable of being clamped tight in the groove 2 of the base plate in such a way that it is not capable of moving relative thereto. By means of its clamping jaws, the workpiece W can be clamped tight against the abutment 18a, 18b. A self-contained force path is obtained when tightening via the points at which the workpiece engages the jaws 3a and the abutment 18a, 18b, as well as via the abutment points 19a, 10b, and 10a, 1d, said force path not being affected by the operation of the saw teeth.

The rotary disc 7 has a groove defined by walls 21 extending inclined toward the interior of the hollow cylindrical projection 6 of the rotary disc in the vicinity of the saw blade 15, through which groove the liquid coolant can flow off together with sawing fines. Coolant which might flow off over the edge of the rotary disc 7 can be discharged through ports 22 (FIG. 1) of the base plate 1, without it being able to impair the bearing surfaces of the rotary disc 7 on the base plate. An adjusting screw 23 provided on the casing 13, capable of engaging a needle 24 (FIG. 1) of the projection 10 of the rotary disc, is provided for limiting the pivot angle of the casing 13.

Referring to FIGS. 4-9, in a quadrangular base plate 1 there is mounted a turntable 7 which can be locked against rotation by a hand lever 5, the said turntable having a slot 30 for the saw blade 15 and having a projection or mount 10 to which, by means of a pin 11, there is articulated a hand lever 17 which bears the sawblade 15 which is driven by a motor 14 about the axis 25. By means of the hand lever 17, therefore, the saw blade 15 can be advanced in a substantially vertical direction against the workpiece W. Two backstop bars 18a and 18b which are in alignment with one another and fixedly joined together by a joining piece 19 are fastened onto the base plate 1 by means of bolts 20a and 20b such that their faces, which engage the workpiece W, substantially span the turntable 7. The upper marginal portion of 19c of part 19 has the shape of a cylindrical surface about the center axis 26 of the turntable 7. The matching cylindrical surface of projection or mount 10 lies against this cylindrical surface. The substantially vertical plane in which the saw blade axis 25 is advanced during the sawing is at a distance of several centimeters, 5 cm, for example, from the contact plane of the backstop bars 18a and 18b (see also FIG. 5). A cutout 19d is provided in the backstop bars 18a and 18b and their joining portion 19, so that miter cuts of as much as 45° can be made in addition to square cuts.

Figure 4:
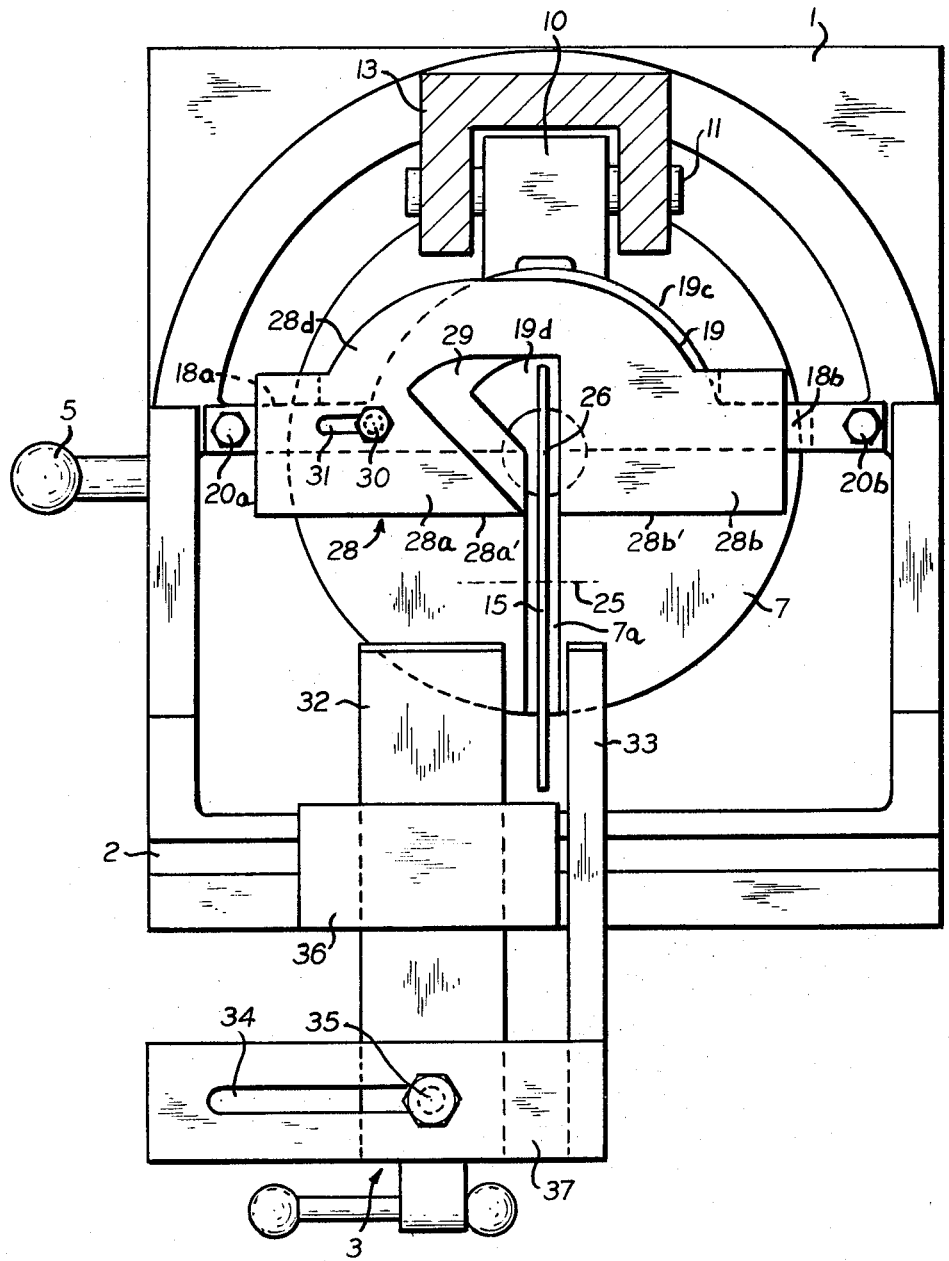
FIG. 4 shows a top view of the circular saw according to the invention, in which the lever bearing the circular saw blade is cut away.
Figure 5:
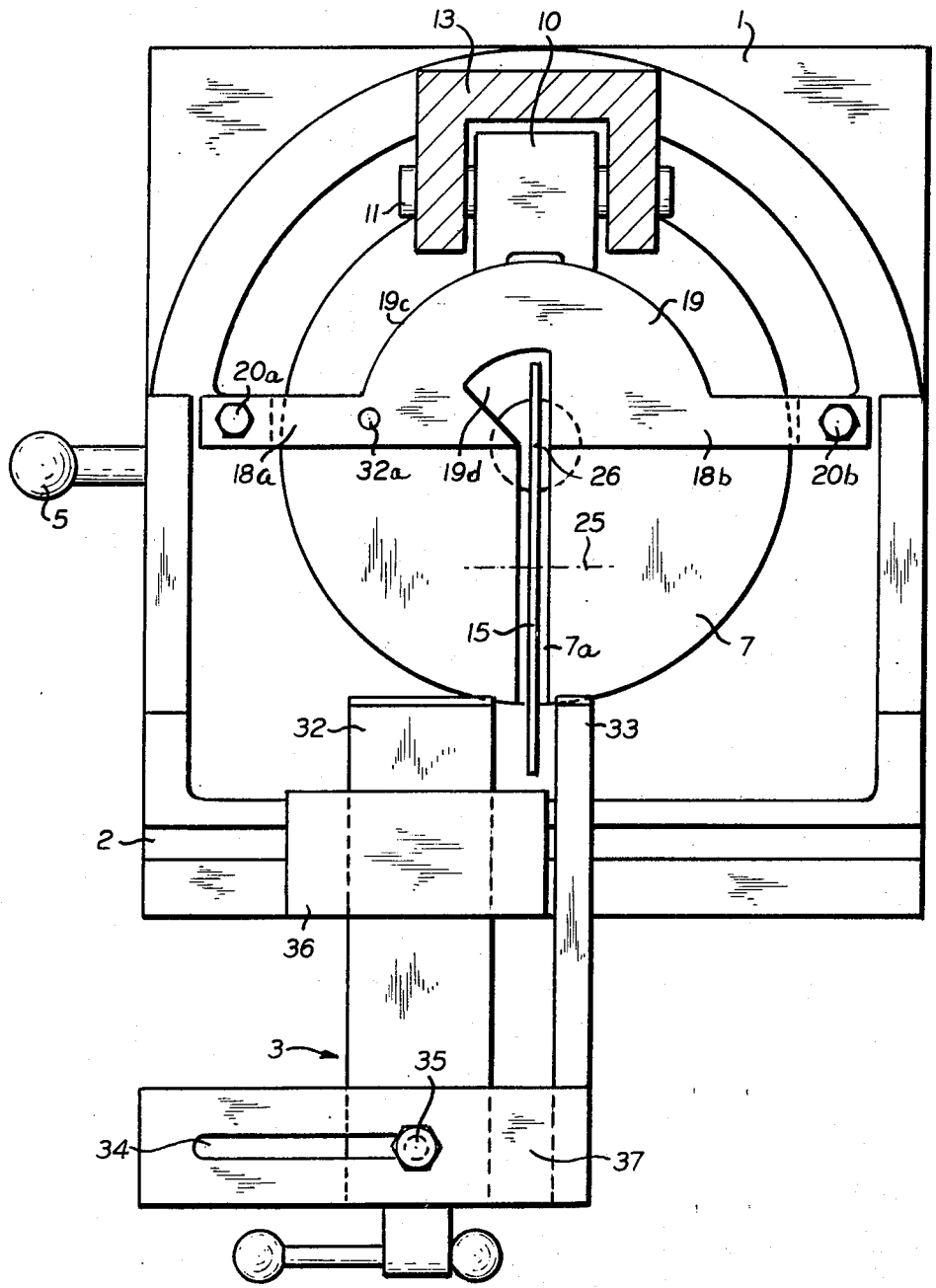
FIG. 5 shows the same arrangement as in FIG. 4, but with the auxiliary backstop bar attachment removed.
Figure 7:
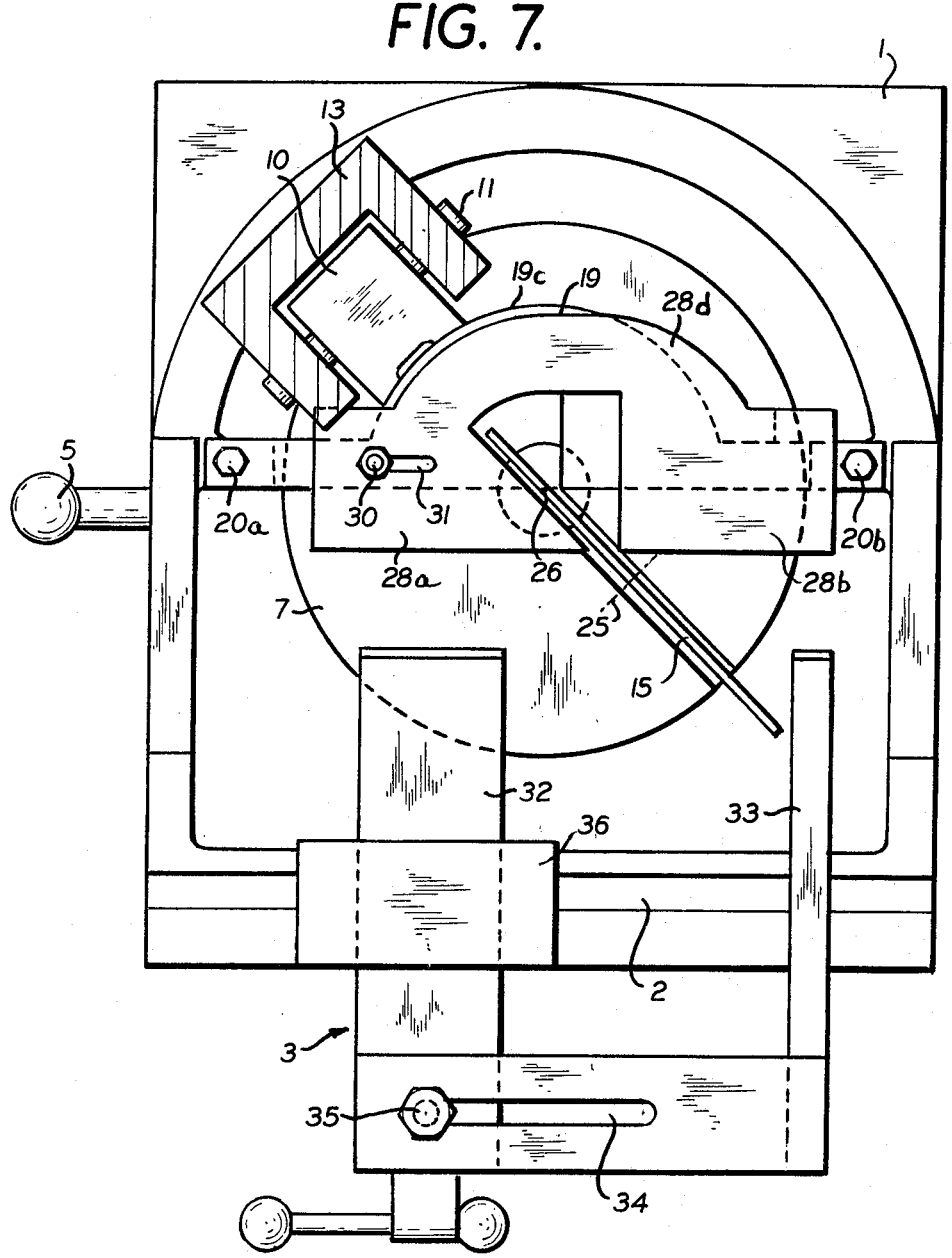
FIG. 7 is a top view of FIG. 4, but with the saw making a 45° miter cut.

An auxiliary backstop bar attachment 28, which is represented in FIG. 5 and FIG. 6, is placed onto these backstop bars, which are especially easy to see in FIG. 5, this being done as shown in FIGS. 4, 6 and 7. This auxiliary backstop bar attachment 28 has two backstop arms 28a and 28b whose faces 28a' and 28b' are parallel to the faces 18a and 18b when the auxiliary backstop bar attachment is placed on the backstop bars. The auxiliary backstop bar attachment arms 28a and 28b are joined to one another by a flat joining portion 28d which, when attachment 28 is mounted in place, lies above the joining portion 19. The backstop arms 28a and 28b have on their underside a groove 28c whose width is equal to the width of the backstop bars 18a and 18b. The depth of groove 28c corresponds to the height of the backstop bars 18a and 18b, so that the backstop bar attachment 28, after it is mounted, extends all the way down to turntable 7. The distance between the faces 28a' and 28b' and the adjacent parallel boundary surface of groove 28c can be half as great as the distance between the surface in which the sawblade axis 25 moves when sawing and the backstop faces of the principal backstop bars 18a and 18b. The auxiliary backstop bar attachment 28 has a cutout 29 corresponding to the cutout 19d in the joining portion 19 at backstop 18a, 18b. Furthermore, the backstop bar attachment 28 has an elongated hole 31 above the backstop bar 18a, through which a bolt 30 is passed which can be screwed into a threaded hole 32a.

The base plate has a groove 2 which is parallel to the faces of parts 18b and 28a-28b and serves to carry a guiding member 36 of a vise 3. In the guiding member 36 a vise jaw 32 is advanceable at right angles to the groove 2, so that the workpiece W can be held between the jaw 32 and the backstop face 28a'. On the outer end of the vise jaw 32 there is mounted a crosshead 37 bearing a second vise jaw 33 located on the other side of the sawblade 15. This crosshead 37 has an elongated hole 34 through which a bolt 35 screwed into vise jaw 32 passes, so that the crosshead together with the vise jaw 33 lies close to the saw blade 15 not only when the workpiece is being cut off at a right angle (FIG. 4) but also in the case of a 45° miter cut (FIG. 7). As shown by FIGS. 4 and 7, the workpiece is held between jaws 32 and 33 and backstop arms 28a and 28b in an excellent manner during every kind of cut.

The spacing of the plane of the axis of the saw blade and the engaging surface of the principal backstop can be, as stated above, about 5 cm; as a range, can be mentioned 3-8 cm. The radius of the saw assembly from the pivot mounting thereof at pin 11 to the axis of the saw blade can be about 15-40 cm, preferably 18-30 cm and the corresponding ranges for the cutting arc of the saw blade can be 20°-35°, preferably 25°-30°.

Notwithstanding the illustrated uses of the invention and the manners by which such use may be achieved, it is appreciated that changes and modifications will suggest themselves to those skilled in the art both for uses similar to those illustrated as well as for other uses. The invention, therefore, is not to be deemed to be limited to the exact mode of execution above disclosed by way of example, and it will be understood that the invention embraces all such changes and modifications in the parts, and in the construction, combination and arrangement of parts as shall come within the purview of the appended claims.

What is claimed is:

1. In a circular saw machine for cold-sawing metals comprising:

a. a base plate, b. a disc for supporting the workpiece and rotatable mounted on the base plate for rotation thereon, c. laterally adjustable clamping means for engaging the forward portion of the workpiece, d. backstop clamping means for engaging the rearward side of the workpiece including a clamping strip disposed on each side of the cutting plane joined together by a rearwardly extending semi-circular arcuate member, secured to the baseplate, e. a saw assembly pivotally mounted on the machine comprising a saw blade and means for driving the saw blade, said mounting being for generally vertical advance of the saw blade relative to the disc for cutting of the workpiece, the improvement which comprises:

f. the arcuate member of the backstop having a rearwardly disposed, bearing surface which is cylindrical with respect to the axis of the disc disposed adjacent the upper level of the arcuate member, g. said disc comprising a saw assembly mount disposed to the rear and outwardly of said backstop arcuate member, for said pivot mounting of the saw assembly on the machine, h. said saw assembly mount comprising bearing means for complementary bearing engagement with the bearing surface of the arcuate member adjacent the plane of cutting of the saw blade.

2. Saw according to claim 1, said saw assembly mount comprising supporting means extending downwardly to supported engagement with the base plate.

3. Saw according to claim 1, the disc being in engagement with the base plate about the entire circumference of the disc.

4. Saw according to claim 3, and means for drawing the disc downwardly into tight fitting engagement with base plate.

5. Saw according to claim 1, said disc having means for discharge of cuttings and coolant from beneath the saw blade.

6. Saw according to claim 5, said discharge means comprising a downwardly extending groove, the disc having an opening communicating with said groove for receiving cuttings and coolant therefrom.

7. Saw according to claim 1, wherein said base plate is outfitted with an opening disposed outwardly of the disc, for discharge of cuttings and coolant.

8. Saw according to claim 1, the saw blade axis during the pivoting thereof for sawing, moving along a substantially vertical plane, said plane being spaced several centimeters from the engaging surface of the backstop clamping means, for sawing of a square cutoff, and an auxiliary removable backstop means for mounting on the first mentioned backstop means for selective spacing of the workpiece from said substantially vertical plane of the axis of the saw.

9. Saw according to claim 8, said spacing of the plane of the axis of the saw and the engaging surface of the first-mentioned backstop being about 3–8 centimeters, the radius of the saw assembly from the pivot mounting thereof to the axis of the saw being about 40–80 centimeters and the corresponding range for the cutting arc of the saw being 20°–35°.

10. Saw according to claim 8, said auxiliary backstop having two backstop arms whose faces are aligned with one another and have on their underside a recess parallel to said faces whose shape is the same as the shape of the first mentioned backstop.

11. Saw according to claim 10, the arms of the auxiliary backstop being joined together by a joining member (28d) which, when the auxiliary backstop bar attachment is mounted onto the first-mentioned backstop, lies above the arcuate of the first-mentioned backstop.

12. Saw according to claim 11, wherein a slot suitable to accommodate the sawblade flares backward from the vise at an angle of about 45° to at least one side, both in the first-mentioned backstop bars and the auxiliary backstop bar attachment.

13. Saw according to claim 8, wherein the auxiliary backstop is displaceable in its longitudinal direction on the first-mentioned backstop bars (18a, 18B).

14. Saw according to claim 13, wherein means are provided for limiting said longitudinal displacement.

15. Saw according to claim 1, wherein the laterally adjustable clamping means (c) has on each side of the sawblade close to the plane of the sawblade in a square cutoff of the workpiece, a jaw which is advanceable toward the first-mentioned backstop, and that one jaw is adjustable in relation to the other jaw at right angles to the direction of advance of the jaws to such an extent that the two jaws grip the workpiece on both sides of the sawblade even in the case of a 45°miter cut.

* * * * *